No. 784,463. PATENTED MAR. 7, 1905.
A. YANCEY.
FEEDING DEVICE FOR ACETYLENE GENERATORS.
APPLICATION FILED MAY 25, 1904.
5 SHEETS—SHEET 1.
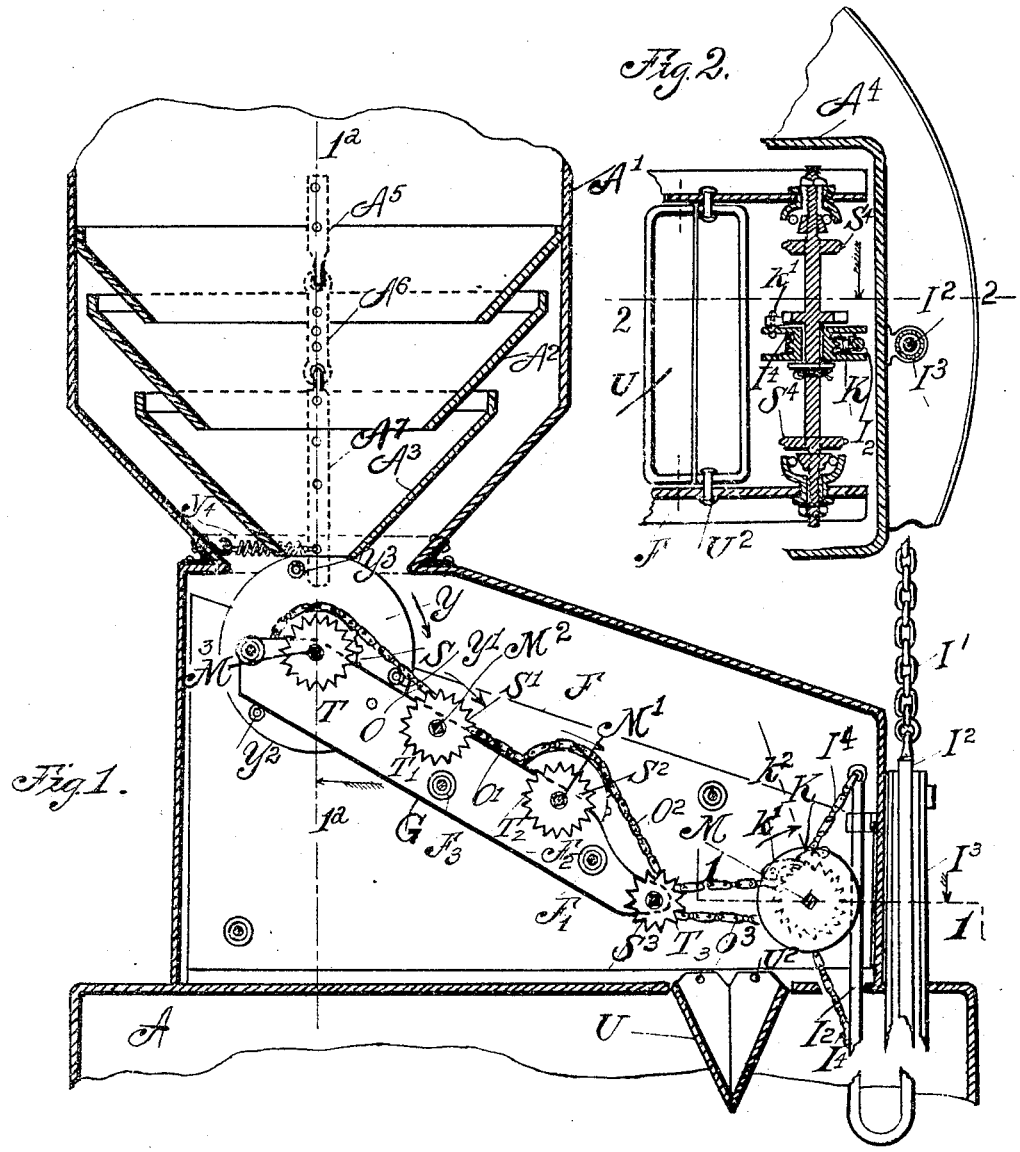

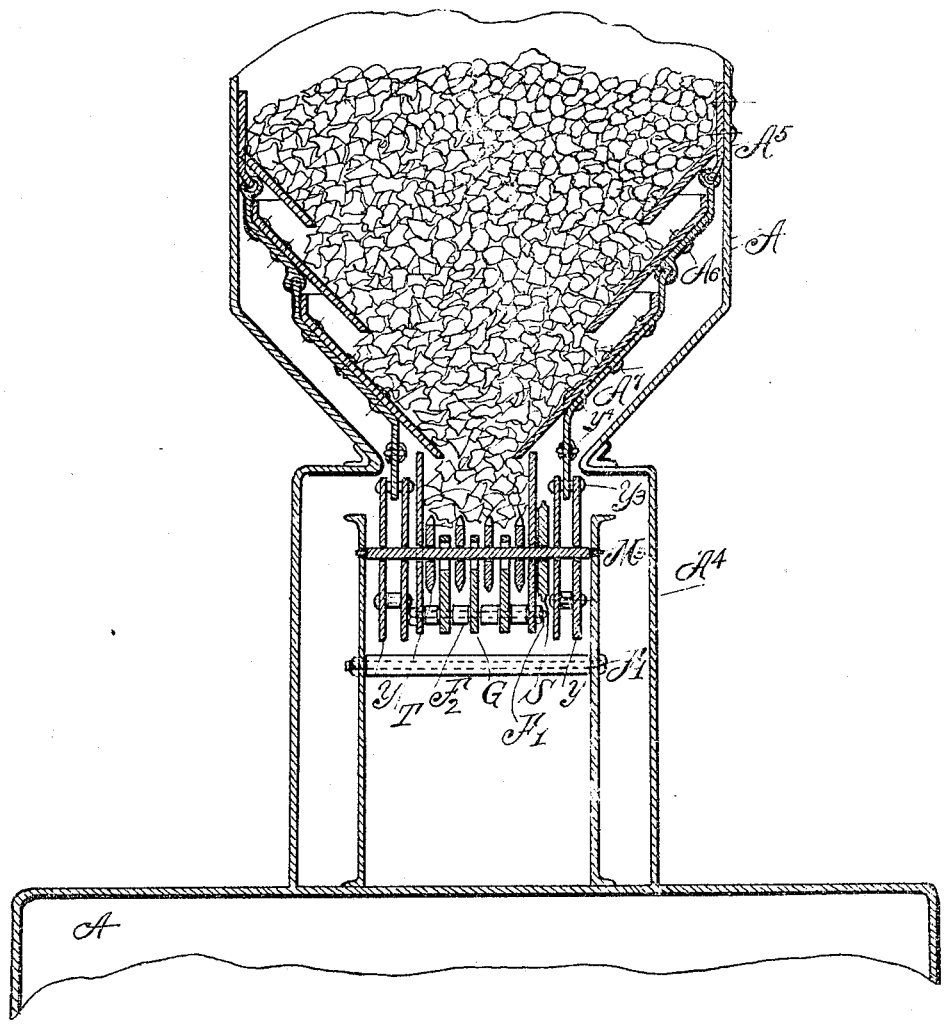

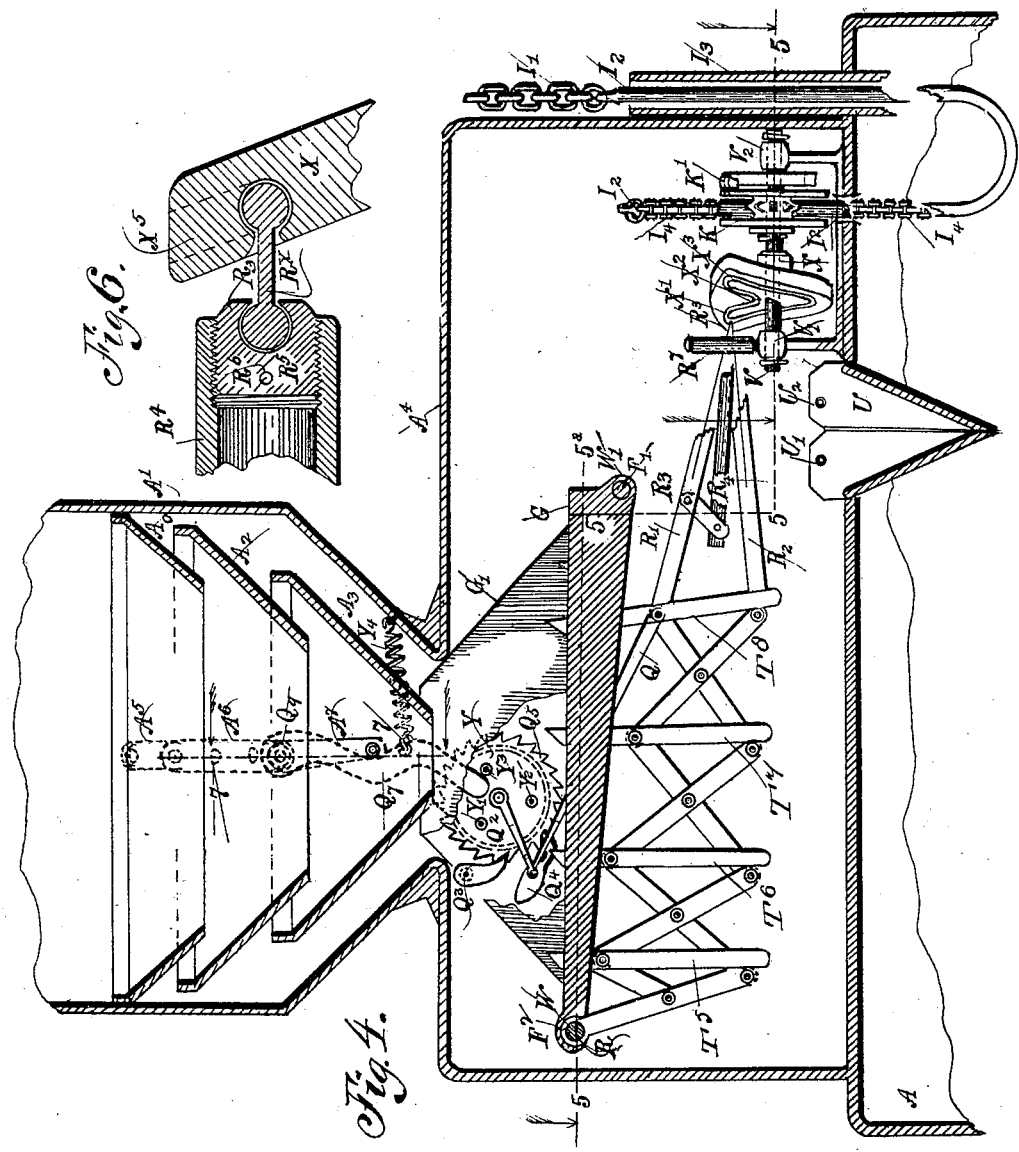

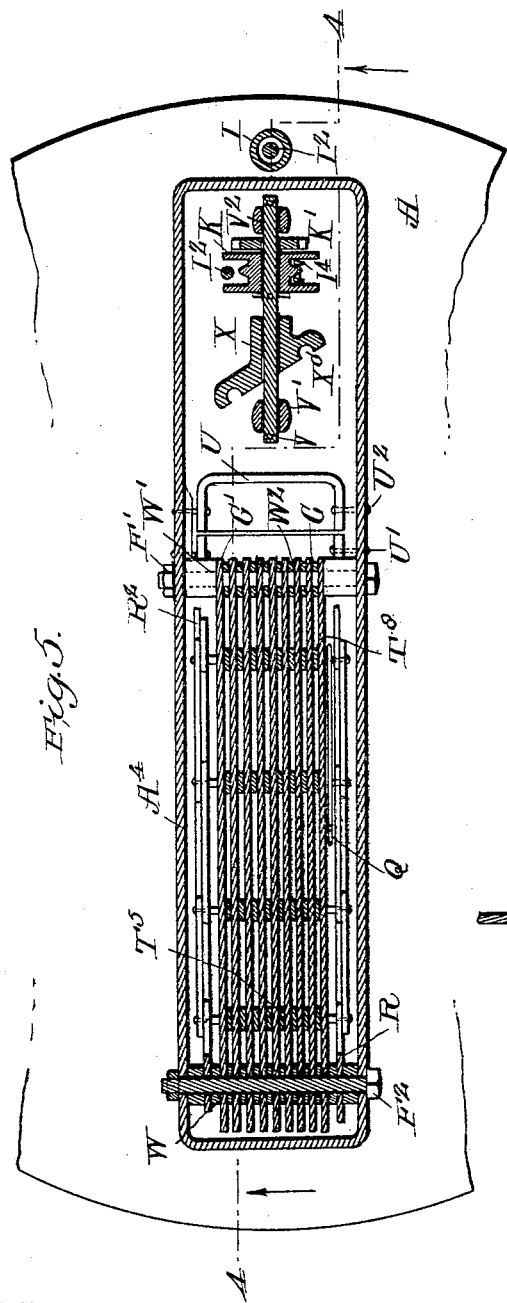
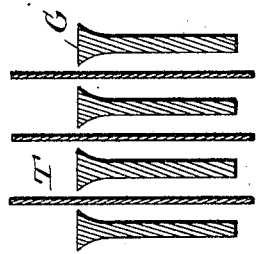
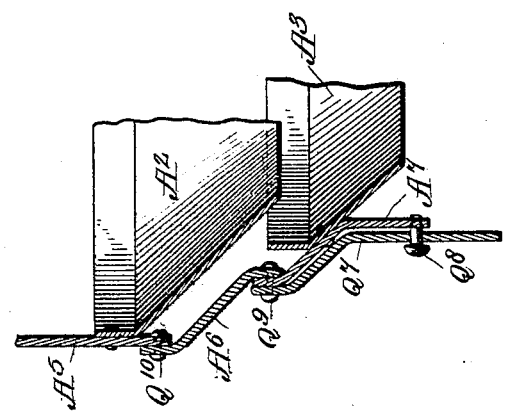

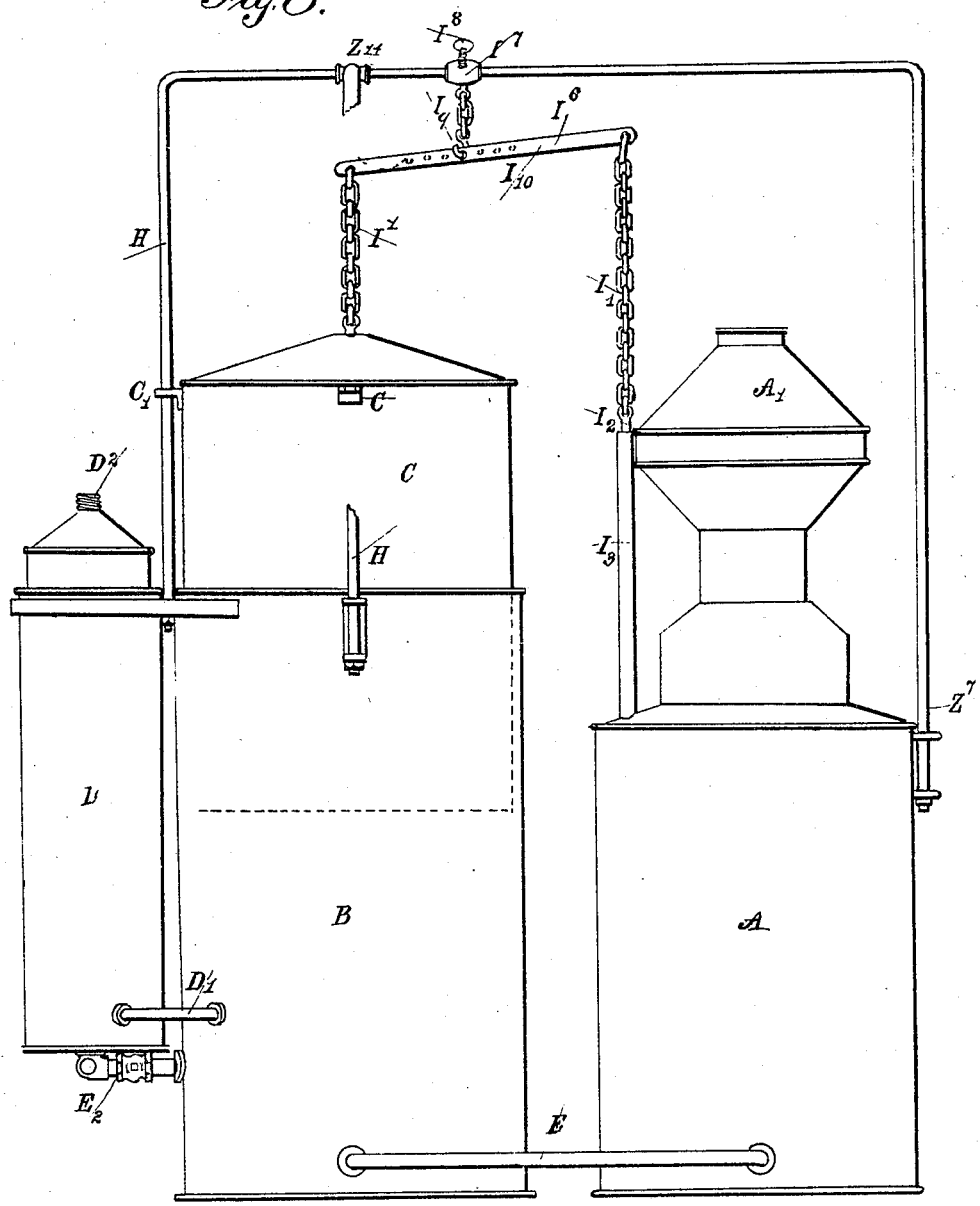

No. 784,463.  Patented March 7, 1905.

UNITED STATES PATENT OFFICE.

ARTHUR YANCEY, OF DERMOTT, ARKANSAS.

FEEDING DEVICE FOR ACETYLENE-GENERATORS.

SPECIFICATION forming part of Letters Patent No. 784,463, dated March 7, 1905.

Application filed May 25, 1904. Serial No. 209,735.

*To all whom it may concern:*

Be it known that I, ARTHUR YANCEY, a citizen of the United States, residing at Dermott, in the county of Chicot and State of Arkansas, have invented a new and useful Feeding Device for Acetylene-Generators, of which the following is a specification.

My invention relates to improvements in acetylene-generators in which calcium carbid is fed into water in granular or lump form; and it relates mainly to certain improvements in the feed mechanism therefor wherein a plurality of swinging hopper-bottoms form a throat through which the carbid passes to a series of conveyers and thence to the water below. Automatic oscillation or jarring of the said hopper-bottoms prevents the stoppage of the flow of carbid to the conveyers, and the conveyers distribute and properly regulate the feed of carbid to the water. The hopper and its series of swinging depending bottoms are shown as used in conjunction with the several forms of differential conveyers described in my former application, filed April 12, 1904, Serial No. 202,811.

In the accompanying drawings, Figure 1 is a vertical cross-section of the feeding device, taken on the line 2 2 of Fig. 2 looking in the direction of the arrow. Fig. 2 is a horizontal cross-section of a part of the feeding device on the line 1 1 of Fig. 1 and looking in the direction of the arrow. Fig. 3 is a vertical cross-section on the line $1^a$ $1^a$ of Fig. 1 looking in the direction of the arrow. Figs. 4, 5, and 6 show the improved hopper as applied to another form of generator, Fig. 6 being on an enlarged scale. Fig. 7 shows a modified form of the hopper construction in which the depending bottoms are jarred automatically and intermittently by the feed mechanism. Fig. 8 shows one embodiment of my invention in which a separate generator and gasometer are used and in which the feed of the carbid is automatically controlled by the rise and fall of the gasometer. Fig. 9 shows the preferred form of the grate-bars used and is on an enlarged scale.

Any desired form of differentially-speeded conveyers may be used.

Referring to Fig. 8, A represents the generator, and A' the hopper in which the carbid is placed to be fed to the water below. B is a tank containing the water-buoyed gasometer C. E is any conveniently-sealed water-pipe conveying the gas from the generator to the gasometer. $E^2$ is a pipe which affords a passage for the gas from the gasometer to the filter D, through which the gas passes and is then delivered into the service-pipe, which is screwed onto the nipple $D^2$, D' being a pipe which provides a water-seal in the filter. As illustrated, the fall of the gasometer C sets the feed device in operation by means of the chains I', lever $I^6$, and feed-rod $I^2$, which passes through a water-sealed tube $I^3$ and which when raised, as shown in Figs. 1 and 2, engages, by means of the chain $I^4$, the sprocket on the ratchet-drum K, which is mounted on the shaft M. To this drum is fastened the ratchet $k'$ and the sprocket-wheels $S^4$. Consequently the upward movement of the rod $I^2$ revolves the shaft M and also the shafts M', $M^2$, and $M^3$, which are all connected together by sprocket-chains. The sprocket-wheels on which these last-named sprocket-chains are mounted, however, are of different sizes, so that the upper shaft $M^3$ revolves very slowly, the next shaft $M^2$ a little faster, and so on through the series. When the bell C rises, the drum K of the pawl $K^2$ loosely revolves in the reverse direction without moving the shaft M. Circular disks T T' $T^2$ $T^3$, of thin stiff metal, such as aluminium, revolve, respectively, with the shaft M, M', $M^2$, and $M^3$ and may be loosely adjusted on said shaft and separated by the grate-bars G. These grate-bars should be inclined to the axis of the hopper at an angle somewhat less than the piling-angle of the carbid and with a limit of obtuseness which will just maintain an inert condition of the carbid on the conveyers or grate-surface when the said conveyers are at rest. On the shaft $M^3$, the highest of the series of shafts and the one nearest the hopper-mouth, are two drums Y, which revolve in the direction of the curved arrow shown in Fig. 1 and which near their peripheries are provided with rollers Y', $Y^2$, and $Y^3$, which intermittently produce a jarring or oscillation of the swinging hopper-bottoms, as hereinafter described. The hoppers A′, A², and A³ are loosely mounted one below the other, Fig. 1, being supported by the linked straps or bands A⁵, A⁶, and A⁷, Figs. 1 and 3. The link A⁷ is rigidly fastened to the hopper A³ and engages with the said rollers Y′, Y², and Y³ of the revolving drum D, such engagement producing an oscillation of the hopper-bottoms in one direction at intervals, and said hopper-bottoms are moved in the opposite direction, when released, by means of a spring Y⁴ or equivalent device. This oscillation or jarring movement prevents any arching of the carbid in the hopper, which arching is apt to occur in carbid-feed mechanisms and which it is one of the objects of my present invention to prevent.

In Fig. 7 is shown another form of the arch-breaking device. A knocker Q⁷ is used to engage with the rollers of the drum Y. This knocker is loosely mounted on the pivot Q⁹ and when released by the rollers imparts, by means of a spring or equivalent device, a blow which is distributed throughout the system of hopper-bottoms A′, A², and A³, the blow being applied to the stop Q⁸.

In the device shown in Figs. 4, 5, and 6 instead of the circular disks a series of tines T⁶, T⁷, and T⁸ are used, operating between the grate-bars, which tines are supported on the differential rack R R′ R². One end of the rack is pivotally supported at R. It will be observed that if the other end, R⁴, be moved forward the various sets of tines will be respectively moved through distances increasing with the distance from the pivot R. Thus the set T⁶ may move twice as far as the set T⁵, the set T⁷ four times, and the set T⁸ eight times as far as the set T⁵. The differential rack is operated as follows: The shaft V is caused to revolve in one direction in the manner hereinafter explained. On this shaft is provided a cam X, having a tortuous groove, in which groove the connecting-rod R⁴ of the rack engages, as shown in Fig. 6, the parts being so arranged that the movable end of the rack will be uniformly drawn forward throughout the greater part of one revolution of the shaft V and in the remaining fraction of said revolution quickly return to its initial position and simultaneously lower so that the tines are beneath the carbid grate throughout the entire return movement.

In Fig. 9 I have shown the preferred form of the grate-bars, in which the upper part represents the widest section of said bars, so that the spaces in which the carriers move between the grate-bars are proportionally wider below the surface forming the grate, thus preventing the lodging of small particles of carbid which might fall between the grate-bars. It is obvious that the grate might be cast in one piece, if desired, with conveyer-spaces between, or that it might be made of separate bars.

As shown in Fig. 8, the carbid-feed may be conveniently regulated by shifting the fulcrum of the lever I⁶ at I⁹ and adjusting the sleeve I⁷, secured to the frame H, by the thumb-screw I⁸.

The feed mechanism and unused carbid may be protected from the action of the aqueous vapor formed when the gas is generated by the oscillating chutes U, swinging on pivots so as to remain normally closed, but which may be automatically opened by the falling carbid. Springs or weights may be provided to keep these chutes normally closed.

While I have thus described my invention, I wish it to be distinctly understood that I do not limit myself to the exact details shown and described, as these might be varied widely without departing from the spirit of my invention.

I claim—

1. In an acetylene-generator, the combination of a carbid-hopper provided with a series of open-mouthed bottoms arranged vertically and means for agitating said bottoms by the action of the gas generated, substantially as described.

2. In an acetylene-generator, the combination of a gasometer, a generator, a carbid-hopper provided with a series of movable open-mouthed bottoms arranged vertically, and means to move said bottoms by the movement of the gasometer-bell, substantially as described.

3. In an acetylene-generator, the combination of a carbid-hopper provided with a series of movable open-mouthed bottoms arranged vertically, means for jarring said bottoms by the action of the gas generated, and a series of conveyers located below said hopper-bottoms, substantially as described.

4. In an acetylene-generator, the combination of a carbid-hopper provided with a series of movable open-mouthed bottoms arranged vertically, means to impart motion to said bottoms by the action of the gas generated, and a series of differentially-speeded conveyers beneath said hopper-bottoms, substantially as described.

5. In an acetylene-generator, the combination of a carbid-hopper provided with a series of movable open-mouthed bottoms arranged vertically, means for jarring said bottoms, a casing surrounding the same provided with an opening, and means for normally closing said opening to prevent aqueous vapor rising therethrough, substantially as described.

6. In an acetylene-generator, the combination of a casing divided into two compartments separated by a perforated partition, feed mechanism in one of said compartments and the second compartment being adapted to contain liquid, the said feed mechanism including a carbid-hopper, and a series of movable open-mouthed hopper-bottoms arranged vertically, and means for agitating said movable bottoms, and means for normally closing the perforation forming a communication between said compartments, said means being normally closed but automatically opened by the falling carbid, substantially as described.

7. The combination for producing a regular feed in acetylene-generators, of a carbid-hopper provided with a series of movable bottoms, and a series of differential conveyers set between inclined grate-bars, and automatic means to operate same, substantially as described.

8. In an apparatus for the generation of acetylene, the combination for producing a regular feed and protecting the unused carbid, of a hopper provided with agitating means, with a plurality of differential conveyers set in spaces on a grate-surface, and means for simultaneously operating aforesaid means and conveyers; all aforesaid inclosed in one compartment and separated from the generating-chamber by a diaphragm provided with a normally closed chute, substantially as described.

9. A feeding apparatus for acetylene-generators comprising a series of conveyers separated by grate-bars which are widest on the surface presented to the carbid so that the spaces in which said conveyers operate increase in width downward, substantially as described.

10. A feeding apparatus for acetylene-generators comprising a hopper and a series of conveyers moving in spaces in a grate-surface, over which the carbid is carried, and operated by power applied from a suitably external source, substantially as described.

11. A feeding apparatus for acetylene-generators comprising a hopper, a set of grate-bars and a series of conveyers operating between said grate-bars at differential speeds produced by a rack pivotally fastened at one end and moved in a suitable cycle at the other by power applied at a suitably external source, substantially as described.

12. The combination for reducing the power required to operate an acetylene-feeding device, of a hopper, with an inclined grate-surface containing recesses in which a series of tines are uniformly moved forward at different speeds, partly above said grate-surface, and suddenly returned entirely beneath said surface to an initial position by power transformed from a suitably external source, substantially as described.

13. In a feeding apparatus for acetylene-generators, the combination of a grate, fingers working between the bars of said grate, a differential rack for operating said fingers, a cam provided with a tortuous groove with which the end of said rack engages, and means for moving said cam, substantially as described.

14. In an acetylene-generator, the combination with a gasometer and a generator, of a feeding device comprising a hopper provided with a series of vertically-arranged open-mouthed bottoms, a series of conveyers receiving the carbid from said hopper, and automatic means comprising a rope, drum, and ratchet-and-pawl construction connected to water-sealed vertical shafts, to impart motion to said conveyers by the movement of the gasometer, substantially as described.

In testimony whereof I have signed my name to this specification in the presence of two witnesses.

ARTHUR YANCEY.

Witnesses:
J. E. WALLACE,
W. F. THOMAS.